(12) United States Patent
Vincent

(10) Patent No.: US 11,879,062 B2
(45) Date of Patent: Jan. 23, 2024

(54) BITUMINOUS COMPOSITION SOLID AT AMBIENT TEMPERATURE

(71) Applicant: TOTAL MARKETING SERVICES, Puteaux (FR)

(72) Inventor: Régis Vincent, Grigny (FR)

(73) Assignee: TOTAL MARKETING SERVICES, Puteaux (FR)

( * ) Notice: Subject to any disclaimer, the term of this patent is extended or adjusted under 35 U.S.C. 154(b) by 360 days.

(21) Appl. No.: 17/296,412

(22) PCT Filed: Dec. 6, 2019

(86) PCT No.: PCT/EP2019/083972
§ 371 (c)(1),
(2) Date: May 24, 2021

(87) PCT Pub. No.: WO2020/120314
PCT Pub. Date: Jun. 18, 2020

(65) Prior Publication Data
US 2022/0025182 A1 Jan. 27, 2022

(30) Foreign Application Priority Data
Dec. 10, 2018 (EP) .................... 18306653

(51) Int. Cl.
| | | |
|---|---|---|
| *C08L 95/00* | (2006.01) | |
| *C04B 26/26* | (2006.01) | |
| *C08K 5/20* | (2006.01) | |
| *C08K 5/25* | (2006.01) | |
| *C04B 111/00* | (2006.01) | |

(52) U.S. Cl.
CPC .............. *C08L 95/00* (2013.01); *C04B 26/26* (2013.01); *C08K 5/20* (2013.01); *C08K 5/25* (2013.01); *C04B 2111/0075* (2013.01); *C08L 2555/22* (2013.01); *C08L 2555/34* (2013.01); *C08L 2555/60* (2013.01)

(58) Field of Classification Search
None
See application file for complete search history.

(56) References Cited

U.S. PATENT DOCUMENTS

| | | |
|---|---|---|
| 2017/0226320 A1 | 8/2017 | Mariotti et al. |
| 2019/0241743 A1 | 8/2019 | Gauthier et al. |
| 2019/0248705 A1 | 8/2019 | Mouazen |
| 2019/0352229 A1* | 11/2019 | Mouazen ................ C08L 95/00 |
| 2019/0359526 A1 | 11/2019 | Hung et al. |
| 2019/0382583 A1 | 12/2019 | Vincent |

FOREIGN PATENT DOCUMENTS

| | | | |
|---|---|---|---|
| WO | WO-2017203154 A1 * | 11/2017 | ......... C04B 20/1044 |
| WO | 2018/193210 A1 | 10/2018 | |
| WO | 2018/193211 A1 | 10/2018 | |

OTHER PUBLICATIONS

Jan. 23, 2020 Search Report issued in International Patent Application No. PCT/EP2019/083972.

Jun. 8, 2021 International Preliminary Report on Patentability issued in International Patent Application No. PCT/EP2019/083972.

* cited by examiner

*Primary Examiner* — Alexandra M Moore
(74) *Attorney, Agent, or Firm* — Oliff PLC

(57) ABSTRACT

A bituminous composition and a process for the preparation of bituminous mixes including at least one bitumen base, at least one compound of general formula $Ar_1\text{-}R_1\text{—}Ar_2$ (I), and at least one compound of general formula $R_2\text{—}(NH)_n\text{CONH—X—}(NHCO)_p(NH)_n\text{—}R'_2$ (II). The composition is used as road binder, notably for the preparation of bituminous mixes.

20 Claims, No Drawings

BITUMINOUS COMPOSITION SOLID AT AMBIENT TEMPERATURE

The invention is directed to the use as a road binder of a bituminous composition. The invention also relates to a bituminous composition which is solid at ambient temperature, notably at high ambient temperature. The present invention also relates to a process for the manufacture of bituminous mixes.

STATE OF THE ART

Bitumen or bituminous binder is the main hydrocarbon binder used in the road-building sector and in civil engineering. To be used for these different applications, bitumen may present specific physico-chemical and mechanical properties. Firstly, the bitumen has to be sufficiently hard and should have a good consistency at the temperatures of use in order to prevent rutting phenomena due to road traffic. Bitumen may also be elastic in order to resist to the distortions caused by the traffic and/or changes in temperature, these phenomena leading to the cracking of the bituminous mixes and/or to the stripping of the superficial aggregates. At last, bitumen has to be sufficiently fluid at the temperatures of application that should be the lowest as possible in order to permit, for example, the formation of a good mix with the aggregates and an easy processing of the obtained bituminous mix on the road. A convenient bituminous binder has thus to combine hardness and consistency but also elasticity at the temperatures of use and a low viscosity at the temperatures of processing and application.

Generally, the bitumen, taken alone, is not sufficiently elastic. Polymers, optionally crosslinked, are added to the bitumen in order to significantly improve elasticity. However, crosslinking of the polymer chains is irreversible: once crosslinking achieved, it is impossible to turn back to the initial state that existed before the crosslinking reaction. Crosslinked bituminous compositions have good elastic properties but have a very high viscosity. One of the drawbacks of this high viscosity is the need to heat the crosslinked bitumen to a temperature of processing and application which is superior to that is used for non-crosslinked bitumens, thus increasing energetic costs and resulting in the need of supplementary protections for the operators.

Depending on the intended application, it is necessary to find the good compromise between all the mechanical properties of the binder, notably between elasticity, hardness, consistency and viscosity, in particular viscosity at hot temperature.

Another important aspect associated to the use of bitumen concerns transportation, handling and storage. Generally, bitumen is stored and transported under hot conditions, in bulk, in tank trucks or by boats at elevated temperatures of the order of 120° C. to 160° C. As a point of fact, the storage and the transportation of bitumen under hot conditions exhibit certain disadvantages. First, the transportation of bitumen under hot conditions in the liquid form is considered to be dangerous and is highly restricted from a regulatory viewpoint. This mode of transportation does not present particular difficulties when the transportation equipment and infrastructures are in good condition. But if this is not the case, it can become problematic: if the tank truck is not sufficiently lagged, the viscosity of the bitumen can increase during an excessively long trip. Bitumen delivery distances are therefore limited. Second, keeping bitumen at elevated temperatures in vessels or in tank trucks consumes energy. In addition, keeping bitumen at elevated temperatures for a lengthy period of time can affect the properties of the bitumen and thus change the final performance qualities of the bituminous mix.

In order to overcome the problems of the transportation and the storage of bitumen under hot conditions, packagings which make possible the transportation and the storage of bitumens at ambient temperature have been developed. This mode of transportation of bitumen in packaging at ambient temperature represents only a minimal fraction of the amounts transported worldwide but it corresponds to real needs for geographic regions to which access by conventional transportation means are difficult and expensive.

U.S. Pat. No. 7,918,930 teaches the preparation of a bitumen base presenting some characteristics of a blown bitumen, the bitumen base being prepared by the addition of a blowing additive of general formula $Ar_1$—R—$Ar_2$. This document is not concerned with the transportation and/or the storage of the bituminous compositions.

WO 2008/107551 teaches the reversible reticulation of bitumen compositions based on the use of organogelators additives. The obtained bituminous compositions have a penetrability, measured at 25° C., of from about 40 to 70 1/10 mm.

WO 2016/16320 discloses the preparation of bitumen blocks comprising at least one chemical additive. The obtained blocks have a good creeping resistance and do not agglomerate during their transportation and/or handling and/or storage.

WO 2018/115729 discloses a binder composition, notably a bituminous composition, comprising at least one acid compound of general formula R—(COOH)z and at least one amide compound of general formula R'—$(NH)_n$CONH—$(X)_m$—$(NHCO)_p$—$(NH)_n$—R".

None of these documents discloses bituminous compositions comprising the association of the two additives as defined here-after.

The Applicant has now surprisingly discovered new bituminous compositions that are solid at ambient temperature and which may be used as road binder. The bituminous compositions according to the invention are advantageous in that they allow preventing and/or reducing more efficiently the phenomena of agglomeration, or sticking, which may occur during the transportation and/or the handling and/or the storage of the bituminous composition in a divided form, notably at high ambient temperature and over extended periods of time. Bituminous compositions according to the invention are further advantageous in that that their properties are maintained over time, notably during transportation and/or storage and/or handling. It is important that a balance be struck between reducing bitumen units (pellets or blocks for example) sticking and producing a bitumen that has satisfying mechanical properties.

More specifically, the Applicant has discovered that the new bituminous compositions, conditioned in a divided form, notably in the form of blocks or pellets, have an improved creeping resistance. This creeping resistance is particularly important in extreme conditions of transportation and/or storage and/or handling and/or under compression, particularly compression due to storage, over long periods of time.

SUMMARY OF THE INVENTION

The invention is directed to a bituminous composition comprising at least:
a) a bitumen base,
b) a compound of general formula (I):

$$Ar1\text{-}R_1\text{—}Ar_2 \qquad (I)$$

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and
$R_1$ represents an optionally substituted hydrocarbon divalent radical, the main chain of which comprises from 6 to 20 carbon atoms and at least one group chosen from the amide, ester, hydrazide, urea, carbamate and anhydride functional groups,
c) a compound of general formula (II):

$$R_2\text{—}(NH)_n CONH\text{—}X\text{—}(NHCO)_p(NH)_n\text{—}R'_2$$

wherein:
the $R_2$ and $R'_2$ groups, which are identical or different, represent a hydrocarbon chain comprising from 1 to 22 carbon atoms which is optionally substituted and which optionally comprises one or more heteroatoms, such as N, O or S, and $R_2$ can be H,
the X group represents a hydrocarbon chain comprising from 1 to 22 carbon atoms which is optionally substituted and which optionally comprises one or more heteroatoms, such as N, O or S, and
n and p are integers having a value of 0 or 1, independently of each other.

According to a favorite embodiment, the invention is directed to a bituminous composition which is solid at ambient temperature and in a divided form, said bituminous composition comprising at least:
a) a bitumen base,
b) a compound of general formula (I):

$$Ar1\text{-}R1\text{-}Ar2 \qquad (I)$$

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more C1-C20 alkyl groups, and
R1 represents an optionally substituted hydrocarbon divalent radical, the main chain of which comprises from 6 to 20 carbon atoms and at least one group chosen from the amide, ester, hydrazide, urea, carbamate and anhydride functional groups,
c) a compound of general formula (II):

$$R_2\text{—}(NH)_n CONH\text{—}X\text{—}(NHCO)_p(NH)_n\text{—}R'_2 \qquad (II)$$

wherein:
the $R_2$ and $R'_2$ groups, which are identical or different, represent a hydrocarbon chain comprising from 1 to 22 carbon atoms which is optionally substituted and which optionally comprises one or more heteroatoms, such as N, O or S, and $R_2$ can be H,
the X group represents a hydrocarbon chain comprising from 1 to 22 carbon atoms which is optionally substituted and which optionally comprises one or more heteroatoms, such as N, O or S, and
n and p are integers having a value of 0 or 1, independently of each other.

The invention is also directed to the use as road binder of a bituminous composition as above defined and disclosed in detail here-under.

In particular, the invention concerns the use as a road binder of a bituminous composition comprising at least:
a) a bitumen base,
b) a compound of general formula (I):

$$Ar1\text{-}R1\text{-}Ar2 \qquad (I)$$

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and
R1 represents an optionally substituted hydrocarbon divalent radical, the main chain of which comprises from 6 to 20 carbon atoms and at least one group chosen from the amide, ester, hydrazide, urea, carbamate and anhydride functional groups,
c) a compound of general formula (II):

$$R_2\text{—}(NH)_n CONH\text{—}X\text{—}(NHCO)_p(NH)_n\text{—}R'_2 \qquad (II)$$

wherein:
the $R_2$ and $R'_2$, groups, which are identical or different, represent a hydrocarbon chain comprising from 1 to 22 carbon atoms which is optionally substituted and which optionally comprises one or more heteroatoms, such as N, O or S, and $R_2$ can be H,
the X group represents a hydrocarbon chain comprising from 1 to 22 carbon atoms which is optionally substituted and which optionally comprises one or more heteroatoms, such as N, O or S, and
n and p are integers having a value of 0 or 1, independently of each other.

According to a favorite embodiment, the bituminous composition is solid at ambient temperature and in a divided form, preferably in the form of blocks or pellets.

According to a favorite embodiment, the compound of general formula (I) is 2',3-bis[(3-[3,5-di(tert-butyl)-4-hydroxyphenyl]propionyl]propionohydrazide.

According to a favorite embodiment, the compound of general formula (II) is chosen from compounds of general formula (IIA):

$$R_2\text{—}CONH\text{—}X\text{—}NHCO\text{—}R'_2 \qquad (IIA)$$

wherein $R_2$, $R'_2$ and X are as defined above.

According to a favorite embodiment, the bituminous composition comprises from 0.1 to 10% by weight of one or several compounds of general formula (I), preferably from 0.4% to 5% by weight, more preferably from 0.4 to 1% by weight, with respect to the total weight of the bituminous composition.

According to a favorite embodiment, the bituminous composition comprises from 0.1% to 10% by weight of one or several compounds of general formula (II), preferably from 0.5% to 6% by weight, more preferably from 1% to 5% by weight, with respect to the total weight of the bituminous composition.

According to a favorite embodiment, the bitumen base has a penetrability at 25° C., measured according to standard EN 1427, less than or equal to 200 1/10 mm, preferably less than or equal to 100 1/10 mm.

According to a favorite embodiment, the bituminous composition has a ring-and-ball softening temperature, measured according to standard EN 1427, of from 80 to 120° C., preferably from 90° C. to 115° C., more preferably from 95° C. to 110° C.

According to a favorite embodiment, the bituminous composition has a deformability at 65° C., less than or equal to 50%, preferably less than or equal to 25%, more preferably less than or equal to 15%, even more preferably from 1 to 15%, and advantageously from 1 to 10%.

The invention is also directed to a bituminous mix comprising:
(i) a bituminous composition comprising at least:
a) a bitumen base,
b) a compound of general formula (I) as defined above and disclosed in more details here-under,
c) a compound of general formula (II) as defined above and disclosed in more details here-under, and
(ii) aggregates, and/or inorganic fillers and/or synthetic fillers.

According to a favorite embodiment, the bituminous mix is a road bituminous mix, a bituminous concrete or a bituminous mastic.

The invention is also directed to a process for the manufacture of bituminous mixes comprising at least one road binder and aggregates, the road binder being chosen from the bituminous compositions comprising at least:
a) a bitumen base,
b) a compound of general formula (I) as defined above and disclosed in more details here-under,
c) a compound of general formula (II) as defined above and disclosed in more details here-under, said process comprising at least the following steps:
1) heating the aggregates at a temperature ranging from 100° C. to 180° C., preferably from 120° C. to 160° C.,
2) mixing the aggregates with the road binder in a vessel, such as a mixer or a drum mixer,
3) obtaining bituminous mixes.

According to a favorite embodiment of the process, at least part of the aggregates originates from recycled bituminous mixes.

According to a favorite embodiment, the process does not comprise a stage of heating the road binder before it is mixed with aggregates.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

As used herein, the term "consists essentially of" followed by one or more characteristics, means that may be included in the process or the material of the invention, besides explicitly listed components or steps, components or steps that do not materially affect the properties and characteristics of the invention.

The expression "comprised between X and Y" includes boundaries, unless explicitly stated otherwise. This expression means that the target range includes the X and Y values, and all values from X to Y.

Aspects of the present invention relates to a bitumen composition that maybe subjected to an elevated ambient temperature, in particular a temperature ranging up to 100° C., preferably from 20° C. to 80° C.

In some exemplary embodiments, the bitumen is solid at ambient temperatures. By "solid at ambient temperature" it is meant that the bitumen composition is in a solid state and exhibits a solid appearance at ambient temperature, notably at elevated ambient temperature, whatever the conditions of transportation and/or of storage and/or of handling. More specifically, the bitumen composition retains its solid appearance throughout the transportation and/or storage and/or handling at ambient temperature, notably at elevated ambient temperature. The bitumen composition does not creep at ambient temperature, notably at elevated ambient temperature, under its own weight and does not creep when it is subjected to forces of pressures resulting from the conditions of transportation and/or of storage and/or of handling.

The term "penetrability" is understood here to mean the "needle penetrability" or "pen value" measurement, which is carried out by means of an NF EN 1426 standardized test at 25° C. (P25) and/or ASTM D5/DSM. This penetrability characteristic is expressed in tenths of a millimeter (dmm or $1/10$ mm). The needle penetrability, measured at 25° C., according to the NF EN 1426 standardized test, represents the measurement of the penetration into a bitumen sample, after a time of 5 seconds, of a needle, the weight of which with its support is 100 g. The standard NF EN 1426 replaces the equivalent standard NF T 66-004 of December 1986 with effect on Dec. 20, 1999 (decision of the Director General of AFNOR dated Nov. 20, 1999).

The term "softening point" is understood to mean the "ring-and-ball softening point" measurement which is carried out by means of an NF EN 1427 standardized test. The ring-and-ball softening point corresponds to the temperature at which a steel ball of standard diameter, after having passed through the material to be tested (stuck in a ring), reaches the bottom of a standardized tank filled with a liquid which is gradually heated and in which the apparatus has been immersed.

The invention firstly relates to a bituminous composition comprising at least:
a) a bitumen base,
b) a compound of general formula (I):

$$\text{Ar1-R}_1\text{—Ar}_2 \quad (I)$$

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and
$R_1$ represents an optionally substituted hydrocarbon divalent radical, the main chain of which comprises from 6 to 20 carbon atoms and at least one group chosen from the amide, ester, hydrazide, urea, carbamate and anhydride functional groups,
c) a compound of general formula (II):

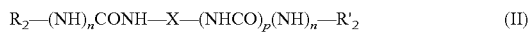

$$R_2-(NH)_n CONH-X-(NHCO)_p(NH)_n-R'_2 \quad (II)$$

wherein:
the $R_2$ and $R'_2$ groups, which are identical or different, represent a hydrocarbon chain comprising from 1 to 22 carbon atoms which is optionally substituted and which optionally comprises one or more heteroatoms, such as N, O or S, and $R_2$ can be H,
the X group represents a hydrocarbon chain comprising from 1 to 22 carbon atoms which is optionally substituted and which optionally comprises one or more heteroatoms, such as N, O or S, and
n and p are integers having a value of 0 or 1, independently of each other.

The Bitumen Base

The term "bitumen" is understood to mean any bituminous composition composed of one or more bitumen bases and optionally comprising one or more additives.

Mention may first of all be made, among the bitumen bases which can be used according to the invention, of bitumens of natural origin, those present in natural bitumen or natural asphalt deposits or bituminous sands, and bitumens originating from the refining of crude oil.

Preferably, the bitumen bases are chosen from bitumen bases originating from the refining of crude oil or from bituminous sands, more preferably chosen from bitumen bases originating from the refining of crude oil.

The bitumen bases can be chosen from bitumen bases or mixtures of bitumen bases originating from the refining of crude oil, in particular bitumen bases containing asphaltenes or pitches.

The bitumen bases can be obtained by conventional processes for the manufacture of bitumen bases in refining, in particular by direct distillation and/or vacuum distillation of oil. These bitumen bases can optionally be visbroken and/or deasphalted and/or air-rectified. It is standard to carry out the vacuum distillation of the atmospheric residues originating from the atmospheric distillation of crude oil. This manufacturing process consequently corresponds to the sequence of an atmospheric distillation and of a vacuum distillation, the feedstock supplying the vacuum distillation corresponding to the atmospheric distillation residues. These vacuum residues resulting from the vacuum distillation tower can also be used as bitumens.

It is also standard to inject air into a feedstock generally composed of distillates and of heavy products originating from the vacuum distillation of atmospheric residues originating from the distillation of oil. This process makes it possible to obtain a blown or semi-blown or oxidized or air-rectified or partially air-rectified base. The various bitumen bases obtained by the refining processes can be combined with one another in order to obtain the best technical compromise. The bitumen base can also be a bitumen base from recycling.

Preferably, the bitumen bases are chosen from bitumen bases of hard or soft grade.

More preferably, the bitumen bases have a penetrability at 25° C., measured according to standard EN 1426, less than or equal to 200 1/10 mm, advantageously less than or equal to 100 1/10 mm.

According to the invention, for conventional processes for the manufacture of bitumen bases, the operation is carried out at manufacturing temperatures of between 100° C. and 200° C., preferably between 140° C. and 200° C., more preferably between 140° C. and 170° C. The bitumen composition is stirred for a period of time of at least 10 minutes, preferably of between 30 minutes and 10 hours, more preferably between 1 hour and 6 hours. The term "manufacturing temperature" is understood to mean the heating temperature of the bitumen base or bases before mixing and also the mixing temperature. The temperature and the duration of the heating vary according to the amount of bitumen used and are defined by the standard NF EN 12594.

According to some aspects of the invention, oxidized bitumens can be manufactured in a blowing unit by passing a stream of air and/or oxygen through a starting bituminous base. This operation can be carried out in the presence of an oxidation catalyst, for example phosphoric acid. Generally, the oxidation is carried out at elevated temperatures, of the order of 200 to 300° C., for relatively long periods of time typically of between 30 minutes and 2 hours, continuously or batchwise. The period of time and the temperature for oxidation are adjusted as a function of the properties targeted for the oxidized bitumen and as a function of the quality of the starting bitumen.

Advantageously, the bitumen bases are chosen from bitumens of natural origin; bitumens originating from bituminous sands; bitumens originating from the refining of crude oil such as the atmospheric distillation residues, the vacuum distillation residues, the visbroken residues, the semi-blown residues and their mixtures; and their combinations or from synthetic bitumens.

According to some exemplary embodiments of the invention, the bitumen base may comprise at least one polymer additive and/or at least one fluxing agent.

In some exemplary embodiments, the polymer additive comprises an elastomeric radial or linear polymer. In some exemplary embodiments, the polymer additive comprises a copolymer such as a linear or radial copolymer.

In some advantageous embodiments the polymer additive comprises one or more of atactic polypropylene (APP), isotactic polypropylene (IPP), SB (styrene/butadiene) block copolymer, SBS (styrene/butadiene/styrene) block copolymer, SIS (styrene/isoprene/styrene) copolymers; polychloroprene; polynorbornene; chloroprene rubber (CR), natural and reclaimed rubbers, butadiene rubber (BR), acrylonitrile-butadiene rubber (NBR), isoprene rubber (IR), styrene-polyisoprene (SI), butyl rubber, ethylene propylene rubber (EPR), ethylene propylene diene monomer rubber (EPDM), polyisobutylene (PIB), SEBS (styrene/ethylene/butylene/styrene) copolymer; chlorinatedpolyethylenes (PE), polyethylene high-density (PEHD), and polypropylenes (PP), ethylene-vinyl acetate copolymers (EVA); ethylene-methylacrylate copolymers (EMA); copolymers of olefins and unsaturated carboxylic esters such as ethylene-butylacrylates (EBA); polyolefinic copolymers; polyolefins such as polybutenes (PB) and polyisobutenes (PIB); copolymers of ethylene and esters of acrylic acid or methacrylic acid or maleic anhydride; ethylene/propylene copolymers; and rubber.

In other exemplary embodiments, the polymer additive comprises a linear polymer or a combination of linear and radial polymers. Examples of polymer modifiers are also disclosed in U.S. Pat. No. 4,738,884 to Algrim et al. and 3,770,559, to Jackson, the contents of which are incorporated herein by reference in their entirety. In some favourite embodiments, the asphalt is modified with styrene-butadiene rubber SBS.

Additional additives may also be included in the bitumen composition. Such additives include, for example vulcanization and/or crosslinking agents which are able to react with the polymer, notably with the elastomer and/or the plastomer, which may be functionalized and/or which may comprise reactive sites.

As vulcanization agents, mentions may be made by way of example of sulphur based vulcanization agents and its derivatives. Such vulcanization agents are generally introduced in a content of from 0.01% to 30% by weight, with respect to the weight of the elastomer.

As crosslinking agents, mentions may be made by way of example of cationic reticulation agents such as mono or polyacids; carboxylic anhydrides; esters of carboxylic acids; sulfonic, sulfuric, phosphoric or chloride acids; phenols. Such crosslinking agents are generally introduced in a content of from 0.01% to 30% by weight, with respect to the weight of the polymer. These agents are likely to react with the functionalized elastomer and/or plastomer. They may be used to complete and/or to substitute vulcanization agents.

Preferably, the bituminous composition according to the invention comprises from 80 to 99.8% by weight of one or several bitumen bases, more preferably from 89 to 99.1% by weight, and even more preferably from 94 to 98.6% by weight, with respect to the total weight of the bituminous composition.

Compounds of General Formula (I)

The bituminous composition according to the invention comprises at least one compound of general formula (I):

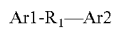

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and R1 represents an optionally substituted hydrocarbon divalent radical, the main chain of which comprises from 6 to 20 carbon atoms and at least one group chosen from the amide, ester, hydrazide, urea, carbamate and anhydride functional groups, preferably chosen from hydrazide functional groups.

Preferably, Ar1 and/or Ar2 are substituted by at least one alkyl group comprising from 1 to 10 carbon atoms, advantageously in one or more ortho positions with respect to the hydroxyl group(s); more preferably Ar1 and Ar2 are 3,5-dialkyl-4-hydroxyphenyl groups, advantageously 3,5-di(tert-butyl)-4-hydroxyphenyl groups.

Preferably, R1 is in the para position with respect to a hydroxyl group of Ar1 and/or Ar2.

Advantageously, the compound of general formula (I) is 2',3-bis[(3-[3,5-di(tert-butyl)-4-hydroxyphenyl]propionyl)]propionohydrazide.

Preferably, the bituminous composition according to the invention comprises from 0.1 to 10% by weight of one of several compounds of general formula (I), with respect to the total weight of the bituminous composition.

More preferably, the bituminous composition according to the invention comprises at least 0.4% by weight of one or several compounds of general formula (I), with respect to the total weight of the bituminous composition Advantageously, the bituminous composition according to the invention comprises from 0.4 to 5% by weight of one or several compounds of general formula (I), more advantageously from 0.4 to 1% by weight, with respect to the total weight of the bituminous composition.

Compounds of General Formula (II)

The bituminous composition according to the invention comprises at least one compound of general formula (II):

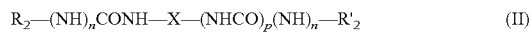

wherein:
the $R_2$ and $R'_2$ groups, which are identical or different, represent a saturated or unsaturated and linear, branched or cyclic hydrocarbon chain comprising from 1 to 22 carbon atoms which is optionally substituted by one or more hydroxyl groups or amine groups and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S, and $R_2'$ can be H;

the X group represents a saturated or unsaturated and linear, cyclic or branched hydrocarbon chain comprising from 1 to 22 carbon atoms which is optionally substituted and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S;

n and p are integers having a value of 0 or 1, independently of each other.

Preferably, the $R_2$ and/or $R'_2$ group comprises an aliphatic hydrocarbon chain of from 4 to 22 carbon atoms, in particular, chosen from the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the X group represents a saturated linear hydrocarbon chain comprising from 1 to 22 carbon atoms, more preferably from 1 to 12 carbon atoms, even more preferably from 1 to 10 carbon atoms, advantageously from 1 to 4 carbon atoms.

More preferably, the X group is chosen from the $C_2H_4$ and $C_3H_6$ groups.

Preferably, the compound of general formula (II) is chosen from those which satisfy the condition n=0.

Preferably, the compound of general formula (II) is chosen from those which satisfy the condition: the sum of the numbers of the carbon atoms of $R_2$, X and $R'_2$ is greater than or equal to 10, advantageously greater than or equal to 14, preferably greater than or equal to 18.

Preferably, the compound of general formula (II) is chosen from those which satisfy the condition: the number of the carbon atoms of at least one of $R_2$ and $R'_2$ is greater than or equal to 10, advantageously greater than or equal to 12, preferably greater than or equal to 14.

Preferably, the compound of general formula (II) is chosen from those of formula (IIA):

wherein $R_2$, $R'_2$, m and X have the same definitions as above.

Preferably, in the formula (IIA), the X group represents a saturated linear hydrocarbon chain comprising from 1 to 22 carbon atoms, more preferably from 1 to 12 carbon atoms and even more preferably from 1 to 4 carbon atoms. More preferably, the X group is chosen from the $C_2H_4$ and $C_3H_6$ groups.

Preferably, the compound of general formula (IIA) is chosen from those which satisfy the condition: the sum of the numbers of the carbon atoms of $R_2$, X and $R'_2$ is greater than or equal to 10, advantageously greater than or equal to 14, preferably greater than or equal to 18.

Preferably, the compound of general formula (IIA) is chosen from those which satisfy the condition: the number of the carbon atoms of at least one of $R_2$ and $R'_2$ is greater than or equal to 10, advantageously greater than or equal to 12, preferably greater than or equal to 14.

More preferably, the compound of general formula (IIA) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

More advantageously still, the compound of general formula (IIA) is N,N'-ethylenedi(stearamide) of formula $C_{17}H_{35}$—CONH—$CH_2$—$CH_2$—NHCO—$C_{17}H_{35}$.

Preferably, the bituminous composition according to the invention comprises from 0.1 to 10% by weight of one or several compounds of general formula (II), more preferably from 0.5 to 6% by weight, even more preferably from 1 to 5% by weight, with respect to the total weight of the bituminous composition.

Optional Additives

According to a particular embodiment, the bituminous composition according to the invention may also comprise one or more optional additives, preferably chosen from olefinic polymer adjuvants.

Advantageously, the olefinic polymer adjuvant is chosen from the group consisting of (a) ethylene/glycidyl (meth) acrylate copolymers; (b) ethylene/monomer A/monomer B terpolymers and (c) the mixtures of these copolymers:

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously chosen from random or block, preferably random, terpolymers of ethylene, of a monomer A and of a monomer B.

The monomer A is chosen from vinyl acetate and $C_1$ to $C_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

(c) The olefinic polymer adjuvant may consists of a mixture of two or more copolymers chosen from copolymers (a) and terpolymers (b).

The olefinic polymer adjuvant is, advantageously chosen from (b) ethylene/monomer A/monomer B terpolymers as defined above and the mixtures (c) comprising such terpolymers.

Preferably, the olefinic polymer adjuvant is chosen from (b) ethylene/monomer A/monomer B terpolymers as defined above and the mixtures (c) comprising at least 50% by weight of terpolymers (b), preferably at least 75% by weight, more preferably at least 90% by weight, with respect to the total weight of the mixture.

More preferably, the olefinic polymer adjuvant is chosen from random terpolymers (b) of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

Preferably, the number average molecular mass (Mn) of the olefinic polymer adjuvant, determined by gel permeation chromatogry with a styrene standard, is from 5 000 to 50 000 g·mol$^{-1}$, more preferably from 10 000 to 40 000 g·mol$^{-1}$, even more preferably from 25 000 to 40 000 g·mol$^{-1}$.

Preferably, the mass average molecular mass (Mw) of the olefinic polymer adjuvant, determined by gel permeation chromatogry with a styrene standard, is from 10 000 to 250 000 g·mol$^{-1}$, more preferably from 50 000 to 200 000 g·mol$^{-1}$, even more preferably from 10 000 to 150 000 g·mol$^{-1}$.

Advantageously, according to this embodiment, the bituminous composition comprises from 0.05 to 15% of one or several olefinic polymer adjuvants, more preferably from 0.1 to 10 by weight, even more preferably from 0.5 to 6% by weight, with respect to the total weight of the bituminous composition.

The Bituminous Composition

Preferably, the bituminous composition according to the invention comprises, or better consists essentially of:
  a) one or several bitumen bases,
  b) one or several additives of general formula (I),
  c) one or several additives of general formula (II), and
  d) optionally, one or several olefinic polymer adjuvants as defined above More preferably, the bituminous composition according to the invention comprises, preferably consists essentially of:
  a) from 80 to 99.8% by weight of one or several bitumen bases,
  b) from 0.1 to 10% by weight of one or several additives of general formula (I),
  c) from 0.1 to 10% by weight of one or several additives of general formula (II), and
  d) optionally, from 0.05 to 15% by weight of one or several olefinic polymer adjuvants as defined above,
  with respect to the total weight of the bituminous composition.

Advantageously, the bituminous composition according to the invention comprises, preferably consists essentially of:
  a) from 89 to 99.1% by weight of one or several bitumen bases,
  b) from 0.4 to 5% by weight of one or several additives of general formula (I),
  c) from 0.5 to 6% by weight of one or several additives of general formula (II), and
  d) optionally, from 0.1 to 10% by weight of one or several olefinic polymer adjuvants as defined above,
  with respect to the total weight of the bituminous composition.

More advantageously, the bituminous composition according to the invention comprises, preferably consists essentially of:
- a) from 94 to 98.6% by weight of one or several bitumen bases,
- b) from 0.4 to 1% by weight of one or several additives of general formula (I),
- c) from 1 to 5% by weight of one or several additives of general formula (II), and
- d) optionally, from 0.5 to 6% by weight of one or several olefinic polymer adjuvants as defined above, with respect to the total weight of the bituminous composition.

Preferably, the bituminous composition according to the invention has a penetrability at 25° C., measured according to standard EN 1426, less than or equal to 40 1/10 mm, more preferably from 5 to 40 1/10 mm, even more preferably from 10 to 35 1/10 mm, and advantageously from 15 to 30 1/10 mm.

Preferably, the bituminous composition according to the invention has a ring-and-ball softening point, measured according to standard EN 1427, of from 80 to 120° C., more preferably from 90° C. to 115° C., and even more preferably from 95° C. to 110° C.

Preferably, the bituminous composition according to the invention has a maximum force (Fmax) greater than or equal to 5 N, preferably greater than or equal to 10 N, more preferably greater than or equal to 20 N, even more preferably greater than or equal to 30 N, advantageously greater than or equal to 40 N, more advantageously greater than or equal to 50 N, even more advantageously greater than or equal to 60 N.

In some advantageous embodiments, the bituminous composition according to the invention has a maximum force of from 20 N to 200 N, more preferably from 30 N to 180 N, even more preferably from 40 N to 160 N, advantageously from 50 to 150 N, more advantageously from 60 to 100 N.

The maximum force (Fmax) may for example by measured with a texture analyzer commercialized by LLOYD Instruments under the name LF Plus and equipped with a thermal enclosure. The piston of the texture analyzer is a cylinder having a diameter of 25 mm and a height of 60 mm.

A cylindrical metallic box comprising 60 g of the bituminous composition to analyze is introduced inside the thermal enclosure settled at a temperature of 50° C. The cylindrical piston is initially placed in contact with the superior surface of the bituminous composition. Then, the piston is put in a vertical movement to the bottom of the box, at a constant velocity equal to 1 mm/min and over a calibrated distance of 10 mm in order to apply to the superior surface of the bituminous composition a compression strength. The texture analyzer measures the maximal force (Fmax) applied by the piston on the surface of the bituminous composition at 50° C.

The determination of the maximal force (Fmax) allows evaluating the capacity of the bituminous composition to resist to the deformation, when it is submitted to a specific mass having a constant applied velocity. The higher the maximal force (Fmax) is, the better the compression strength a bituminous block obtained from the bituminous composition.

Preferably, the bituminous composition according to the invention has a deformability at 65° C., less than or equal to 50%, more preferably less than or equal to 25%, even more preferably less than or equal to 15%, and advantageously from 0.05 to 15%, and advantageously from 0.1 to 10%.

The deformability of a bituminous composition may for example be determined according to the following protocol.

The bituminous composition to be analyzed is first poured in a circular silicon mold and then cooled at ambient temperature for at least 1 hour before being unmolded.

The lower plate of an ANTON PAAR Physica MCR 301 plate-plate rheometer is heated at a temperature of 65° C. Once the temperature has been reached, the rheometer is equipped with a PP25 mobile before being blanked. The gap of the rheometer is fixed at 2 mm. The unmolded solid bituminous composition is placed on the heated plan. The height of the mobile is then adjusted to 2.1 mm and the surplus of bituminous composition overflowing under the mobile is cut out by using a heated spatula. The gap of the rheometer is finally re-adjusted at 2 mm and the bell, previously heated at 65° C., is placed over the whole instrument. The measurement is launched as soon as the rheometer indicates a normal force value equal to 0 N. The constraint applied to the sample is set at 100 Pa and the acquisition time at 7200 s.

Preferably, the bituminous composition according to the invention has a viscosity at 160° C., $V_{160}$, measured according to standard NF EN 13702, less than or equal to 500 mPa·s, more preferably from 50 to 500 mPa·s, even more preferably from 100 to 250 mPa·s, advantageously from 120 to 200 mPa·s, and more advantageously from 125 to 175 mPa·s.

Bituminous Composition which is Solid and in a Divided Form at Ambient Temperature According to an embodiment of the invention, the bituminous composition is solid at ambient temperature and in a divided form.

Preferably, according to this embodiment, the bituminous composition according to the invention further comprises at least one olefinic polymer adjuvant as defined above.

Advantageously, according to this embodiment, the bituminous composition according to the invention is conditioned in the form of bituminous blocks or bituminous pellets.

Bituminous Blocks

According to a first variant, the bituminous composition according to the invention is in the form of bitumen blocks.

The term "bitumen block" is intended to mean a block of road bitumen having a weight of between 1 kg and 1000 kg, preferably between 1 kg and 200 kg, more preferentially between 1 kg and 50 kg, even more preferentially between 5 kg and 25 kg, even more preferentially between 10 kg and 30 kg, said block advantageously being parallelepipedal, preferably being cobblestone-shaped.

The bitumen block preferably has a volume of between 1000 cm³ and 50 000 cm³, preferably between 5000 cm³ and 25 000 cm³, more preferentially between 10 000 cm³ and 30 000 cm³, even more preferentially between 14 000 cm³ and 25 000 cm³.

When the bitumen block is handled manually by a person, the weight of the bitumen block may vary from 1 to 20 kg, and from 20 to 50 kg in the case of handling by 2 people. When the handling is carried out by mechanical equipment, the weight of the bitumen block may vary from 50 to 1000 kg.

The bitumen block is advantageously wrapped in a hot-melt film according to any known method, preferably by a film made of polypropylene, polyethylene or a mixture of polyethylene and polypropylene. The bituminous composition packaged in bitumen blocks wrapped in a hot-melt film has the advantage of being ready to use, that is to say it may be heated directly in the melter without prior unwrapping or optionally introduced into the mixing unit for manufacturing road mixes. The hot-melt material that melts with the bitumen does not affect the properties of said bitumen.

The bitumen block may also be packaged in a box according to any known process, preferably in a cartridge box.

In particular, the bitumen block is packaged in a box by pouring the hot bitumen into a box, the wall of the inner face of which is silicone based, then cooled, the dimensions of the box being suited to the desired bitumen block weight and/or volume.

When the bitumen block according to the invention is wrapped in a hot-melt film or is packaged in a box, the applicant has demonstrated that the deterioration of said hot-melt film or of said box during the transportation and/or storage, under cold conditions, of said bitumen block, did not give rise to the creeping of said bitumen. Consequently, the bitumen blocks according to the invention retain their initial shape and do not adhere to one another during their transportation and/or storage under cold conditions, despite the fact that the hot-melt film or the box may be damaged. The absence of creep of the bitumen in block form during its transportation and/or storage under cold conditions is due to the presence of the chemical compounds of formula (I) and (II) within the bitumen.

Bituminous Pellets

According to a second variant, the bituminous composition according to the invention is in the form of bituminous pellets.

The bitumen pellets may have, within the same population of pellets, one or more distinct shapes.

Preferably, the pellets have a cylindrical, spherical, hemispherical, ovoid or tetrahedral form.

According to a first embodiment of the invention, the size of the bitumen pellets is such that the longest average dimension is preferably less than or equal to 50 mm, more preferentially from 3 to 30 mm, even more preferentially from 5 to 20 mm.

Preferably, when the bituminous pellets have a spherical, hemispherical or ovoid form, the size of the bituminous pellets is such that the longest average dimension is from 3 to 30 mm, more preferentially from 5 to 20 mm.

Preferably, when the bituminous pellets have a tetrahedral form, the size of the bituminous pellets is such that the longest average dimension is from 2 to 50 mm, more preferentially from 5 to 50 mm.

For example, the use of a die makes it possible to control the manufacture of pellets of a chosen size. Sieving makes it possible to select pellets according to their size.

Preferably, the bitumen pellets have a weight of from 0.1 g to 50 g, preferably between from 0.2 g to 30 g, more preferentially from 0.2 g to 20 g.

Preferably, when the bituminous pellets have a spherical, hemispherical or ovoide form, the pellets have a weight of from 0.2 g to 10 g, more preferably from 0.2 to 5 g.

Preferably, when the bituminous pellets have a tetrahedral form, the pellets have a weight of from 0.1 g to 50 g, preferentially from 0.2 g to 50 g more preferably from 0.2 to 20 g.

According to a specific embodiment, the bitumen pellets are covered over at least a portion of their surface with an anti-sticking compound, preferably over their whole surface.

In the context of the invention, the term "anti-sticking compound" is intended to mean any compound which limits the agglomeration and/or the adhesion of the blocks or the pellets to one another during transportation thereof and/or storage thereof at ambient temperature and which ensures that they are fluid when they are handled.

Preferably, the anti-sticking compound is chosen from anti-agglomerating agents, viscosifying compounds and their mixtures.

Anti-Agglomerating Agents

According to a first variant, the anti-sticking compound is chosen from anti-agglomerating compounds.

The anti-agglomerating compound is of mineral or organic origin, preferably of mineral origin.

Preferably, the anti-agglomerating compound is chosen from: talc; fines, also known as fillers, generally with a diameter of less than 125 µm, such as siliceous fines, with the exception of limestone fines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as pyrogenic or fumed silica, in particular hydrophobic or hydrophilic pyrogenic or fumed silica, silicates, silicon hydroxides and other silicon oxides; plastic powder; lime; plaster; rubber compost; polymer powder, where the polymers are such as styrene/butadiene (SB) copolymers or styrene/butadiene/styrene (SBS) copolymers, and the mixtures of these materials.

Advantageously, the anti-agglomerating compound is chosen from: fines, generally with a diameter of less than 125 µm, with the exception of limestone fines; wood residues, such as lignin, lignosulfonate, conifer needle powders or conifer cone powders, in particular of pine; sand, such as Fontainebleau sand; glass powder; pyrogenic or fumed silica, in particular hydrophobic or hydrophilic pyrogenic or fumed silica and their mixtures.

Viscosifying Compounds

According a second variant, the anti-sticking compound is chosen from viscosifying compounds.

In the context of the invention, the term "viscosifying compound" is intended to mean any compound which increases the viscosity of a liquid or composition.

Preferably, the viscosifying compound is a material which has dynamic viscosity greater than or equal to 50 mPa·s, preferably from 50 mPa·s to 550 mPa·s, more preferably from 80 mPa·s to 450 mPa·s, the viscosity being a Brookfield viscosity measured at 65° C. The viscosity of the viscosifying compound is measured with a Brookfield CAP 2000+ viscometer at a rotation speed equal to 750 revolution per minute. For each sample, the measure is performed after 30 seconds Preferably, the viscosifying compound is chosen from:
cellulosic derivatives, more preferably from cellulose ethers,
gelling compounds, more preferably from plant or animal origin, such as: gelatin, agar-agar, alginates, starches, modified starches or gellan gums,
polyethylene glycols (PEG) such as PEGs having a molecular weight of from 800 g·mol$^{-1}$ to 8000 g·mol$^{-1}$, for example a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$(PEG-6000), and
the mixtures of these compounds.

More preferably, the viscosifying compound is chosen from:
cellulosic derivatives, more preferably from cellulose ethers, gelling compounds, more preferably from plant or animal origin, such as: gelatin, agar-agar, alginates, or gellan gums, polyethylene glycols (PEG) such as PEGs having a molecular weight of from 800 g·mol$^{-1}$ to 8000 g·mol$^{-1}$, for example a PEG having a molecular weight of 800 g·mol$^{-1}$ (PEG-800), a PEG having a molecular weight of 1000 g·mol$^{-1}$ (PEG-1000), a PEG having a molecular weight of 1500 g·mol$^{-1}$ (PEG-1500), a PEG having a molecular weight of 4000 g·mol$^{-1}$ (PEG-4000) or a PEG having a molecular weight of 6000 g·mol$^{-1}$ (PEG-6000), and the mixtures of these compounds.

Advantageously, the viscosifying compound is chosen from cellulosic ethers.

Preferably, the anti-sticking agent covers at least 50% of the surface of the bituminous pellets, more preferably at least 60%, even more preferably at least 70%, advantageously at least 80%, and more advantageously at least 90% of the surface of the bituminous pellets.

Advantageously, the content of anti-sticking agent present on the surface on the bituminous pellets represents from 0.2 to 10% by weight, preferably from 0.5 to 8% by weight, more preferably from 0.5 to 5% by weight, with respect to the total weight of the granules.

Preferably, the thickness of the layer of anti-sticking agent is greater than or equal to 20 μm, more preferably from 20 μm to 1 mm, even more preferably from 20 to 100 μm.

Process for the Preparation of the Bituminous Composition

The present invention also concerns a process for the preparation of a bituminous composition as defined above, said process comprising contacting, at a temperature of from 70° C. to 220° C., at least one bitumen base, at least one compound of general formula (I), at least one compound of general formula (II), and optionally at least one olefinic polymer adjuvant as defined above, optionally followed by a step of shaping the obtained bituminous composition, notably in a divided form, preferably in the form of pellets or blocks as defined above.

Compounds of general formula (I) and (II), and optionally the olefinic polymer adjuvant, may be added to the bitumen simultaneously or by successive additions.

Preferably, compounds of general formula (I) and (II), and optionally the olefinic polymer adjuvant, are contacted with the bitumen base at a temperature ranging from 90° C. to 180° C., more preferably from 110° C. to 180° C.

The bitumen base used in the above-defined process may be pure or additivated, notably with a polymer, in an anhydrous or emulsion form, or even in association with agglomerates in the form of a bituminous mix.

Advantageously, the process for the preparation of a bituminous composition a comprises the following steps:

A) the introduction of the bitumen in a reactor equipped with mixing means and its heating at a temperature ranging from 70° C. to 220° C., preferably from 90° C. to 180° C., more preferably from 110° C. to 180° C., B) the simultaneous or successive additions of the compounds of general formula (I) and (II), C) optionally, the addition of the olefinic polymer adjuvant(s), D) the mixture of the bituminous composition at a temperature ranging from 70° C. to 220° C., preferably from 90° C. to 180° C., more preferably from 110° C. to 180° C., until obtaining a homogenous composition, and E) optionally, the shaping of the bituminous composition obtained at the end of step D), notably in a divided form, preferably in the form of pellets or blocks.

According to a specific embodiment, steps B) and C) are performed simultaneously in such a way that the compounds of formula (I) and (II) and the olefinic polymer adjuvant are simultaneously added to the hot bitumen.

In the context of bituminous blocks as defined above, step E) may be performed according to any industrially known process. The shaping of the bituminous blocks may for example be performed by extrusion, molding, or according to the manufacturing process described in the document US 2011/0290695.

According to a specific embodiment, and still in the context of the preparation of bituminous blocks, the process as defined above may optionally be followed by an additional step F) of wrapping the obtained bituminous block with a hot-melt film as defined above. The additional step F) may be performed according to any known process In the context of the preparation of bituminous pellets as defined above, step E) may be performed according to any known methods. Mention may be made by way of examples of the manufacturing methods described in U.S. Pat. No. 3,026,568, WO 2009/153324, WO 2012/168380 or WO 2018/104660. According to a specific embodiment, the shaping of the pellets is performed by draining, in particular by using a drum. Other methods may also be used for the fabrication of the pellets such as for example molding, extrusion, co-extrusion technics, . . . .

According to a specific embodiment, and still in the context of the preparation of bituminous pellets, the process as defined above may optionally be followed by an additional step F') of coating the obtained pellets, over all of parts of its surface, with at least one anti-sticking agent as defined above.

The additional step of coating F') may be performed according to any known process. In particular, step F') may be performed by dipping the bituminous pellets obtained at the end of step E) in a coating composition comprising at least one anti-sticking agent, optionally followed by a step of drying.

Process for the Transportation and/or Storage and/or Handling of Bitumen

The invention also relates to a process for the transportation and/or storage and/or handling of bitumen, said bitumen being transported and/or stored and/or handled at ambient temperature, notably at high ambient temperature, in the form of a bituminous composition according to the invention, preferably in a solid and divided form, notably in the form of pellets or blocks as defined above.

Preferably, the bituminous composition according to the invention is transported and/or stored at ambient temperature, notably at an elevated ambient temperature, for a period of time of greater than or equal to 2 months, preferably of greater than or equal to 3 months.

The term "ambient temperature" is understood to mean the temperature resulting from the climatic conditions under which the bitumen is transported and/or stored and/or handled. More specifically, the ambient temperature is equivalent to the temperature achieved during the transportation and/or storage and/or handling of the bitumen, it being understood that the ambient temperature implies that no contribution of heat is contributed other than that resulting from the climatic conditions.

As a consequence, the ambient temperature may reach elevated values, less than 100° C. during the summer, in particular in geographical areas with a hot climate.

Preferably, the ambient temperature is less than 100° C. Advantageously, the ambient temperature is from 20 to 50° C., preferably from 25° C. to 50° C., more preferably from 25 to 40° C.

Preferably, the elevated ambient temperature is from 40° C. to 90° C., preferably from 50° C. to 85° C., more preferably from 50° C. to 75° C., more preferably still from 50° C. to 70° C.

The bituminous compositions according to the invention in a divided form exhibit the advantage that the divided form is retained. Thus, the compositions can be handled, after storage and/or transportation at an elevated ambient temperature. The bituminous compositions according to the invention in a divided form can be transported and/or stored and/or handled in optimal conditions, in particular without creeping during their transport and/or storage, even at an elevated ambient temperature and without degradation of their properties.

Applications

Another aspect of the invention relates to the use of a bituminous composition according to the invention for different industrial applications, notably as road binder.

The invention concerns the use as road binder of a bituminous composition according to the invention, preferably in a solid and divided form, notably in the form of pellets or blocks as defined above.

Preferably, the bituminous composition according to the invention is used, optionally in mixtures with aggregates, possibly originating from recycled bituminous mixes, for the preparation of surface dressings, hot bituminous mixes, cold bituminous mixes, cold-poured bituminous mixes, grave emulsions, base layers, bond layers, tie layers and running layers.

The bituminous mixes are used as materials for the construction and maintenance of road foundations and their surfacing, an also for carrying out all road works. As others combinations of a bituminous binder and road aggregates having specific properties, mention may be made, for example, of anti-rutting layers, draining bituminous mixes, or asphalts (mixtures between a bituminous binder and aggregates of the sand type).

The invention more particularly concerns a process for the manufacture of bituminous mixes comprising at least one road binder and aggregates, the road binder being chosen from the bituminous compositions according to the invention, notably in a solid and divided form at ambient temperature, and in particular in the form of pellets or blocks as defined above.

Preferably, the process for the manufacture of bituminous mixes according to the invention comprises at least the following steps:
1) heating the aggregates at a temperature ranging from 100° C. to 180° C., preferably from 120° C. to 160° C.,
2) mixing the aggregates with the road binder in a vessel, such as a mixer or a drum mixer,
3) obtaining bituminous mixes.

Advantageously, at least part of the aggregates used for the preparation of the bituminous mix are recycled aggregates, notably obtained from recycled bituminous mixes.

In the case where the bituminous composition according to the invention is in the form of blocks or pellets, the process for the manufacture of bituminous mixes of the invention does not require a stage of heating the solid and divided bituminous composition before mixing with the aggregates because, on contact with the hot aggregates, the bitumen which is solid at ambient temperature melts.

The invention also concerns a process for the manufacture of a surface dressing, a hot bituminous mix, a cold bituminous mix, a cold-poured bituminous mix, a grave emulsion, the binder being mixed with aggregates, notably obtained from recycled bituminous mixes, said process comprising at least the preparation of a bituminous composition according to the invention, notably in a solid and divided form at ambient temperature, and in particular in the form of pellets or blocks as defined above.

The invention also relates to a bituminous mix comprising:
(i) a bituminous composition according to the invention,
(ii) aggregates, and/or inorganic fillers and/or synthetic fillers.

Preferably, the bituminous mix according to the invention is a road bituminous mix, a bituminous concrete or a bituminous mastic.

The various embodiments, alternative forms, preferences and advantages described above for each of the subject matters of the invention apply to all the subject matters of the invention and can be taken separately or in combination.

The invention is illustrated by the following examples given as non-limiting.

EXAMPLES

In the following examples, the percentages are indicated by weight, unless otherwise specified.

1. Material and Methods

The rheological and mechanical characteristics of the compositions to which reference is made in these examples are measured by the methods listed in Table 1.

TABLE 1

| Property | Abbreviation | Unit | Measurement standard |
|---|---|---|---|
| Needle penetrability at 25° C. | P25 | 1/10 mm | NF EN 1426 |
| Ring-and-ball softening temperature | RBT | ° C. | NF EN 1427 |
| Viscosity at 160° C. | $V_{160}$ | mPa · s | NF EN 13702 |
| Maximum Force | $F_{max}$ | N | detailed protocol here-after |
| Deformability at 65° C. | Def. | % | detailed protocol here-after |

Bitumen Base:

The bituminous compositions are prepared from the following bitumen bases:
$B_1$: bitumen base of PG64-22 grade, having a penetrability $P_{25}$ of 59 1/10 mm, a Ring and Ball Softening temperature (RBT) of 50° C.
$B_2$: bitumen base of PG70-12 grade, having a penetrability $P_{25}$ of 30 1/10 mm, a Ring and Ball Softening temperature (RBT) of 53.8° C.

Chemical Additives:
Additive A1 of formula (I): 2',3-bis[(3-[3,5-di(tert-butyl)-4-hydroxyphenyl]propionyl)]propionohydrazide (CAS 32687-78-8), sold by BASF under the Irganox MD 1024® brand,
Additive A2 of formula (II): N,N'-ethylene(stearamide), sold by Croda under the name Crodawax 140®.

Method for the Preparation of the Bituminous Compositions

The bitumen base was introduced into a reactor maintained at a temperature of 160° C. with stirring at 300 revolutions/min for two hours. The additives were subsequently introduced into the reactor. The contents of the reactor were maintained at 160° C. with stirring at 300 revolutions/min for 45 minutes.

Method for the Preparation of a Bituminous Block

Around 0.5 kg of the bituminous composition heated at a temperature of 160° C. is poured in a rectangular steel mold covered with a polyethylene thermofusible film. The mold is then cooled at ambient temperature and the block of bituminous composition finally unmolded.

Protocol for the Measurement of the Maximum Force ($F_{max}$)

The bituminous composition was tested to evaluate the compression strength of the composition submitted at a specific mass having a constant applied velocity. The compressive strength was evaluated by the measurement of the maximum force (Fmax) applied on the surface of the bituminous composition without observing any deformation of the bituminous composition. The test was executed at a temperature of 50° C.

The maximum force (Fmax) was measured with a texture analyzer commercialized by LLOYD Instruments under the name LF Plus and equipped with a thermal enclosure. The piston of the texture analyzer is a cylinder having a diameter of 25 mm and a height of 60 mm.

A cylindrical metallic box comprising 60 g of the bituminous composition was introduced inside the thermal enclosure settled at a temperature of 50° C. The cylindrical piston was initially placed in contact with the superior surface of the bituminous composition. Then, the piston was put in a vertical movement to the bottom of the box, at a constant velocity equal to 1 mm/min and over a calibrated distance of 10 mm in order to apply to the superior surface of the bituminous composition a compression strength. The texture analyzer measures the maximal force ($F_{max}$) applied by the piston on the surface of the bituminous composition at 50° C.

The determination of the maximal force ($F_{max}$) allows evaluating the capacity of the bituminous composition to resist to the deformation. The higher the maximal force ($F_{max}$) is, the better the compression strength a bituminous block obtained from the bituminous composition.

Protocol for the Measurement of the Deformability (Def.)

The bituminous composition to be analyzed is first poured in a circular silicon mold and then cooled at ambient temperature for at least 1 hour before being unmolded.

The lower plate of an ANTON PAAR Physica MCR 301 plate-plate rheometer is heated at a temperature of 65° C. Once the temperature has been reached, the rheometer is equipped with a PP25 mobile before being blanked. The gap of the rheometer is fixed at 2 mm. The unmolded solid bituminous composition is placed on the heated plan. The height of the mobile is then adjusted to 2.1 mm and the surplus of bituminous composition overflowing under the mobile is cut out by using a heated spatula. The gap of the rheometer is finally re-adjusted at 2 mm and the bell, previously heated at 65° C., is placed over the whole instrument. The measurement is launched as soon as the rheometer indicates a normal force value equal to 0 N. The constraint applied to the sample is set at 100 Pa and the acquisition time at 7200 s.

2. Preparation of the Different Compositions

The bituminous compositions $C_1$ to $C_8$ corresponding to the mixtures defined in the following Table 2 are prepared according to the above-described protocol.

Compositions $C_1$, $C_2$, $C_5$ and $C_6$ are according to the invention.

Compositions $C_3$, $C_4$, $C_7$ and $C_8$ are comparative.

TABLE 2

| Compositions | $B_1$ (%) | $B_2$ (%) | A1 (%) | A2 (%) |
|---|---|---|---|---|
| $C_1$ | 96.35% | — | 0.65% | 3% |
| $C_2$ | 98% | — | 1% | 1% |
| $C_3$ | 99.35% | — | 0.65% | — |
| $C_4$ | 97% | — | — | 3% |
| $C_5$ | — | 96.35% | 0.65% | 3% |
| $C_6$ | — | 97% | 1% | 2% |
| $C_7$ | — | 97% | — | 3% |
| $C_8$ | — | 99.35 | 0.65% | — |

3. Rheological and Mechanical Properties of the Bitumen Compositions

The rheological and mechanical properties of the compositions $C_1$ to $C_8$ and of the bitumen bases $B_1$ and $B_2$ have been measured according to the above-defined protocols.

The results are given in the following Table 3.

TABLE 3

| | P25 (1/10 mm) | RBT (° C.) | Viscosity $V_{160}$ (mPa · s) | $F_{max}$ (N) | Def. (%) |
|---|---|---|---|---|---|
| $B_1$ | 59 | 50 | 155 | 0.8 | 456200 |
| $C_1$ (inv) | 29 | 101.5 | 146 | 68.3 | 4.6 |
| $C_2$ (inv) | 30 | 106 | 152 | 103 | 11 |
| $C_3$ (comp) | 45 | 98.5 | 157 | 48.5 | 256 |
| $C_4$ (comp) | 45 | 95.5 | 127 | 0.9 | 118.6 |
| $B_2$ | 30 | 53.8 | 193 | 1 | 254000 |
| $C_5$ (inv) | 23 | 98.5 | 157 | 80.7 | 4.8 |
| $C_6$ (inv) | 19 | 100 | 170 | 99.4 | 1.4 |
| $C_7$ (comp) | 22 | 94 | 160 | 2 | 289 |
| $C_8$ (comp) | 26 | 59 | 194 | 34.8 | 13 |

Penetrability at 25° C.

Compositions $C_1$ to $C_4$ have a reduced penetrability as compared to the bitumen base $B_1$ non-specially additivated.

Compositions $C_5$ to $C_8$ have a reduced penetrability as compared to the bitumen base $B_2$ non-specially additivated.

The addition of at least one chemical additive $A_1$ and $A_2$ leads to a hardening of the bitumen base.

Ring-and-Ball Softening Temperature (RBT)

Compositions $C_1$ to $C_4$ have a significantly increased ring-and-ball softening temperature as compared to the bitumen base $B_1$.

Compositions $C_5$ to $C_8$ have an increased ring-and-ball softening temperature as compared to the bitumen base $B_2$.

The highest ring-and-ball temperatures are obtained for compositions $C_1$, $C_2$, $C_5$ and $C_6$ according to the invention. In particular, the ring-and-ball temperature of the bituminous compositions according to the invention is approximately doubled as compared to the RBT value of the bitumen base not additivated.

Viscosity

The additivation of the bitumen base $B_1$ or $B_2$ with at least one chemical additive A1 or A2, or with two additives does not significantly affect the viscosity of the obtained bituminous composition.

This is advantageous because the processing of the bituminous composition can be achieved at temperatures which are not higher than usual.

Maximum Force ($F_{max}$)

Compositions $C_1$, $C_2$, $C_5$ and $C_6$, according to the invention, have a significantly higher maximum force value (between 68.3 and 103N) as compared to the bitumen bases $B_1$ and $B_2$ (respectively, 0.8 and 1N).

According to the results obtained for the compositions $C_4$ and $C_7$, we note that the additivation of the bitumen bases $B_1$ and $B_2$ with the chemical additive A2, taken alone, does not substantially modify their maximum force value.

Reversely, and according to the results obtained for the compositions $C_3$ and $C_8$, the additivation of the bitumen base $B_1$ and $B_2$ with the chemical additive A1, taken alone, leads to an increase of the maximum force.

The maximum force value of the compositions $C_1$ and $C_5$ according to the invention is significantly superior to the maximal force value of the compositions $C_3$ and $C_7$ which solely comprise the additive $A_1$.

This demonstrates a synergy between the additives A1 and A2, which results in a surprising increase of the maximum force of the bituminous compositions comprising both additives.

The improved maximal force value of the compositions according to the invention allows predicting an improved resistance strength of the compositions according to the invention as compared to compositions $C_3$, $C_4$, $C_7$ and $C_8$.

Conditioned in a divided form, and notably in the form of blocks, the compositions according to the invention are stable during their storage. In particular, blocks obtained from a composition according to the invention have an improved creeping resistance as compared to the compositions of the prior art.

Deformability

According to the results obtained for the compositions $C_4$, and $C_7$, we note that the additivation of the bitumen bases $B_1$ and $B_2$ with the chemical additive A2, leads to a significant reduction of the deformability of the bitumen bases $B_1$ and $B_2$.

Similarly, and according to the results obtained for the compositions $C_3$ and $C_8$, we note that the additivation of the bitumen bases $B_1$ and $B_2$ with the chemical additive A1, taken alone, leads to an even more significant reduction of the deformability of the bitumen bases $B_1$ and $B_2$.

Compositions $C_1$, $C_2$, $C_5$ and $C_6$ according to the invention have an even more significantly reduced deformability (between 1.4 and 11%) as compared to the bitumen bases $B_1$ and $B_2$ (respectively, 456 200 and 254 000%).

The combined addition of the additives A1 and A2 leads to a reduction of the deformability of the bitumen bases $B_1$ and $B_2$ which is superior to the reduction observed when only one of these two additives is added.

Conditioned in a divided form, and notably in the form of blocks, the compositions according to the invention are stable during their storage. In particular, blocks obtained from a composition according to the invention are less deformable than the compositions of the prior art.

In addition, these compositions provide bituminous mixes, bituminous concretes and bituminous mastics with satisfying mechanical properties.

The invention claimed is:

1. A bituminous composition which is solid at ambient temperature and in a divided form, said bituminous composition comprising at least:
   a) a bitumen base,
   b) a compound of general formula (I):

Ar1-R$_1$—Ar2   (I)

wherein:
   Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and $R_1$ represents an optionally substituted hydrocarbon divalent radical, the main chain of which comprises from 6 to 20 carbon atoms and at least one group chosen from the amide, ester, hydrazide, urea, carbamate and anhydride functional groups, and c) a compound of general formula (II):

R$_2$—(NH)$_n$CONH—X—(NHCO)$_p$(NH)$_n$—R'$_2$   (II)

wherein:
   the $R_2$ and R'$_2$ groups, which are identical or different, represent a hydrocarbon chain comprising from 1 to 22 carbon atoms which is optionally substituted and which optionally comprises one or more heteroatoms, and $R_2$ can be H, the X group represents a hydrocarbon chain comprising from 1 to 22 carbon atoms which is optionally substituted and which optionally comprises one or more heteroatoms and n and p are integers having a value of 0 or 1, independently of each other.

2. The bituminous composition according to claim 1, which is in the form of blocks or pellets.

3. The bituminous composition as claimed in claim 1, wherein the compound of general formula (I) is 2',3-bis[(3-[3,5-di(tert-butyl)-4-hydroxyphenyl]propionyl)]propionohydrazide.

4. The bituminous composition as claimed in claim 1, wherein the compound of general formula (II) is chosen from compounds of general formula (IIA):

R$_2$—CONH—X—NHCO—R'$_2$   (IIA)

wherein R$_2$ and R'$_2$, which are identical or different, represent a hydrocarbon chain comprising from 1 to 22 carbon atoms which is optionally substituted and which optionally comprises one or more heteroatoms, such as N, O or S, and $R_2$ can be H, and X represents a hydrocarbon chain comprising from 1 to 22 carbon atoms which is optionally substituted and which optionally comprises one or more heteroatoms, such as N, O or S.

5. The bituminous composition as claimed in claim 4, wherein the compound of general formula (IIA) is chosen from the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

6. The bituminous composition as claimed in claim 5, wherein the compound of general formula (IIA) is N,N'-ethylenedi(stearamide) of formula $C_{17}H_{35}$—CONH—$CH_2$—$CH_2$—NHCO—$C_{17}H_{35}$.

7. The bituminous composition as claimed in claim 1, wherein the bituminous composition comprises from 0.1 to 10% by weight of one or more compounds of general formula (I), with respect to the total weight of the bituminous composition.

8. The bituminous composition as claimed in claim 1, wherein the bituminous composition comprises from 0.1% to 10% by weight of one or more compounds of general formula (II), with respect to the total weight of the bituminous composition.

9. The bituminous composition as claimed in claim 1, wherein it comprises from 80 to 99.8% by weight of one or more bitumen bases.

10. The bituminous composition as claimed in claim 1, wherein it comprises from 0.05 to 15% of one or more olefinic polymer adjuvants.

11. The bituminous composition as claimed in claim 1, wherein it comprises:
   a) from 80 to 99.8% by weight of one or more bitumen bases,
   b) from 0.1 to 10% by weight of one or more additives of general formula (I),
   c) from 0.1 to 10% by weight of one or more additives of general formula (II), and
   d) optionally, from 0.05 to 15% by weight of one or more olefinic polymer adjuvants,
      with respect to the total weight of the bituminous composition.

12. The bituminous composition as claimed in claim 1, wherein the bitumen base has a penetrability at 25° C., measured according to standard EN 1427, less than or equal to 200 1/10 mm.

13. The bituminous composition as claimed in claim 1, wherein the bituminous composition has a ring-and-ball softening temperature, measured according to standard EN 1427, of from 80 to 120° C.

14. The bituminous composition as claimed in claim 1, wherein the bituminous composition has a deformability at 65° C., less than or equal to 50%.

15. The bituminous composition as claimed in claim 1, comprising 0.65 to 1 weight % of 2',3-bis[(3-[3,5-di(tert-butyl)-4-hydroxyphenyl]propionyl)]propionohydrazide as the compound of general formula (I) and 1 to 3 weight % of N,N'-ethylenedi(stearamide) as the compound of general formula (II).

16. A bituminous mix comprising:
   (i) a bituminous composition, and
   (ii) aggregates, and/or inorganic fillers and/or synthetic fillers, wherein the bituminous composition comprises at least:
      a) a bitumen base,
      b) a compound of general formula (I):

wherein:
      Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and
      $R_1$ represents an optionally substituted hydrocarbon divalent radical, the main chain of which comprises from 6 to 20 carbon atoms and at least one group chosen from the amide, ester, hydrazide, urea, carbamate and anhydride functional groups,
   c) a compound of general formula (II):

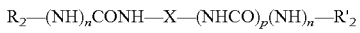

wherein:
      the $R_2$ and $R'_2$ groups, which are identical or different, represent a hydrocarbon chain comprising from 1 to 22 carbon atoms which is optionally substituted and which optionally comprises one or more heteroatoms, and $R_2$ can be H,
      the X group represents a hydrocarbon chain comprising from 1 to 22 carbon atoms which is optionally substituted and which optionally comprises one or more heteroatoms, and
      n and p are integers having a value of 0 or 1, independently of each other.

17. The bituminous mix as claimed in claim 16, which is a road bituminous mix, a bituminous concrete or a bituminous mastic.

18. A process for the manufacture of bituminous mixes as claimed in claim 16, said process comprising at least the following steps:
   1) heating the aggregates at a temperature ranging from 100° C. to 180° C.,
   2) mixing the aggregates with the road binder in a vessel,
   3) obtaining bituminous mixes.

19. The process as claimed in claim 18, wherein at least part of the aggregates originates from recycled bituminous mixes.

20. The process as claimed in claim 18, which does not comprise a stage of heating the road binder before it is mixed with aggregates.

* * * * *